(12) United States Patent
Huang et al.

(10) Patent No.: US 8,731,324 B1
(45) Date of Patent: May 20, 2014

(54) SYSTEMS AND METHODS FOR PERFORMING IMAGE INPAINTING

(71) Applicant: Cyberlink Corp., Shindian (TW)

(72) Inventors: Po-Yu Huang, New Taipei (TW); Ho-Chao Huang, New Taipei (TW)

(73) Assignee: Cyberlink Corp., Shindian, Taipei (TW)

( * ) Notice: Subject to any disclaimer, the term of this patent is extended or adjusted under 35 U.S.C. 154(b) by 88 days.

(21) Appl. No.: 13/667,074

(22) Filed: Nov. 2, 2012

(51) Int. Cl.
*G06K 9/00* (2006.01)
*G06K 9/40* (2006.01)

(52) U.S. Cl.
USPC .......................................... 382/275; 382/167

(58) Field of Classification Search
CPC ...... G06T 5/005; G06T 7/40; H04N 1/40093; H04N 1/4097
USPC .................. 382/167, 254, 274, 275
See application file for complete search history.

(56) References Cited

U.S. PATENT DOCUMENTS

| | | | |
|---|---|---|---|
| 8,073,277 B2 | 12/2011 | Huan et al. | |
| 2003/0099406 A1* | 5/2003 | Georgiev et al. | 382/268 |
| 2004/0164996 A1* | 8/2004 | Criminisi et al. | 345/619 |
| 2005/0068447 A1 | 3/2005 | Steinberg et al. | |
| 2005/0175220 A1* | 8/2005 | Kita | 382/112 |
| 2008/0238942 A1 | 10/2008 | Sun et al. | |
| 2008/0310744 A1* | 12/2008 | Mim et al. | 382/238 |
| 2009/0080796 A1* | 3/2009 | Capata et al. | 382/275 |
| 2009/0202170 A1* | 8/2009 | Weiss | 382/275 |
| 2011/0103706 A1* | 5/2011 | Jeong et al. | 382/254 |
| 2011/0123113 A1 | 5/2011 | Berretty et al. | |

FOREIGN PATENT DOCUMENTS

| | | |
|---|---|---|
| JP | 2007110329 | 4/2007 |
| WO | 2008004903 A1 | 1/2008 |

OTHER PUBLICATIONS

Roumy et al. ("Examplar-based image inpainting—fast priority and coherent nearest neighbor search," IEEE Int'l Workshop on Machine Learning for Signal Processing, Sep. 23-26, 2012, 6 pages).*
Akbari et al. ("Image inpainting with prioritizing of hole's pixels," AISP 2012, 207-210).*
Nikos Komodakis et al. "Image Completion Using Efficient Belief Propogation via Priority Scheduling and Dynamic Pruning," IEEE Transactions on Image Processing, vol. 16, No. 11, pp. 2649-2661, 2007.

(Continued)

*Primary Examiner* — Yubin Hung
(74) *Attorney, Agent, or Firm* — McClure, Qualey & Rodack, LLP

(57) ABSTRACT

Various embodiments are disclosed for performing image inpainting. One embodiment is a method for editing a digital image in an image editing device that comprises obtaining a restoration region in the digital image and generating a structure strength map corresponding to the restoration region based on structure characteristics associated with each pixel in the restoration region. Based on the structure strength map, priority levels are determined for pixels in the restoration region. An inpainting operation is applied to the pixels in the restoration region, beginning with a pixel having a highest relative priority determined based on the structure characteristics.

21 Claims, 14 Drawing Sheets

(56) References Cited

OTHER PUBLICATIONS

A. Criminisi et al. "Region Filling and Object Removal by Exemplar-Based Image Inpainting," IEEE Transactions on Image Processing, vol. 13, No. 9, Sep. 2004.

Jian Sun et al. "Image Completion with Structure Propogation," ACM Transactions on Graphics, vol. 24, No. 3, Jul. 2005, pp. 861-868.

Jiunn-Lin Wu and I-Ying Chou, "An Effective Content-Aware Image Inpainting Method," Accepted by the Journal of Information Science and Engineering Dec. 30, 2010.

Marcelo Bertalmio et al. "Image Inpainting," Proceedings of SIGGRAPH 2000, New Orleans, USA, Jul. 2000.

* cited by examiner

NxN BLOCK CENTERED
ABOUT POINT B

UNSTABLE EDGE VECTOR

| 1 | 2 | 4  | 2 | 1 |
|---|---|----|---|---|
| 2 | 4 | 8  | 4 | 2 |
| 4 | 8 | 16 | 8 | 4 |
| 2 | 4 | 8  | 4 | 2 |
| 1 | 2 | 4  | 2 | 1 |

SMOOTHING KERNEL

STABLE EDGE VECTOR

SYSTEMS AND METHODS FOR PERFORMING IMAGE INPAINTING

BACKGROUND

Over the years, digital content has gained increasing popularity with consumers. With the ever-growing amount of digital content available to consumers through the Internet using computers, smart phones, and other sources, consumers have access to a vast amount of content. Furthermore, many devices (e.g., smartphones) and services are readily available that allow consumers to capture and generate digital images.

The process of inpainting involves reconstructing lost or deteriorated parts of images and videos. Specifically, restoration algorithms are applied to replace portions of an image. A user, for example, may wish to remove one or more regions within an image containing objects or defects. Some inpainting techniques involve filling in the restoration region in the image by searching for similar patches in a nearby source region of the image and then copying the pixels from the most similar patch into the restoration region.

SUMMARY

Briefly described, one embodiment, among others, is a method for editing a digital image in an image editing device that comprises obtaining a restoration region in the digital image and determining structure information corresponding to the restoration region. Based on the structure information, a structure strength map corresponding to the restoration region is generated. Based on the structure strength map, priority levels are determined for pixels in the restoration region and an inpainting operation is applied to pixels in the restoration region based on the corresponding priority levels.

Another embodiment is a system for editing a digital image. The system comprises a structure descriptor generator configured to determine structure descriptors corresponding to a restoration region within the digital image to undergo an inpainting operation and a structure strength map generator configured to generate a structure strength map corresponding to the restoration region based on the structure descriptors. The system further comprises a prioritizer configured to determine a priority level for pixels in the restoration region based on the structure strength map and an inpainting component configured to apply the inpainting operation to pixels in the restoration region based on the corresponding priority levels.

Another embodiment is a method for editing a digital image in an image editing device that comprises obtaining a restoration region in the digital image and generating a structure strength map corresponding to the restoration region based on structure characteristics associated with each pixel in the restoration region. Based on the structure strength map, priority levels are determined for pixels in the restoration region. An inpainting operation is applied to pixels in the restoration region, beginning with a pixel having a highest relative priority.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

The process of inpainting involves reconstructing lost or deteriorated parts of images and videos. Specifically, restoration algorithms are applied to replace lost or corrupted portions of an image. Patch matching is a commonly used technique for inpainting, where this technique works well in cases where the image exhibits regular texture and where the missing information resulting from removal of an object in the image can be reconstructed using suitable patches from information associated with areas in the image that is known (i.e., those areas outside the area to be restored). However, many images comprise unique non-repetitive structures, and structure information associated with an image is typically not considered during the restoration process, thereby resulting in artifacts.

Various embodiments are disclosed for improving the quality of an image after performing image inpainting by analyzing and utilizing information corresponding to image structure during the reconstruction of image pixels in the restoration region. For some embodiments, a structure structure strength map is derived and applied during image inpainting in order to ensure structural continuity in the area being restored. One embodiment, among others, is a method for editing a digital image in an image editing device, where the method comprises obtaining a restoration region in the digital image. For example, the restoration region may be manually defined by a user wishing to remove an object from a digital image.

The method further comprises determining structure information corresponding to the restoration region. Based on the structure information, a structure strength map corresponding to the restoration region is generated. Based on the structure strength map, a priority level for each pixel in the restoration region is determined. Priority-based Image inpainting is then performed on the restoration region based on the corresponding priority level, which structural continuity throughout the restoration region relative to the remainder of the digital image is maintained.

Figure 1:
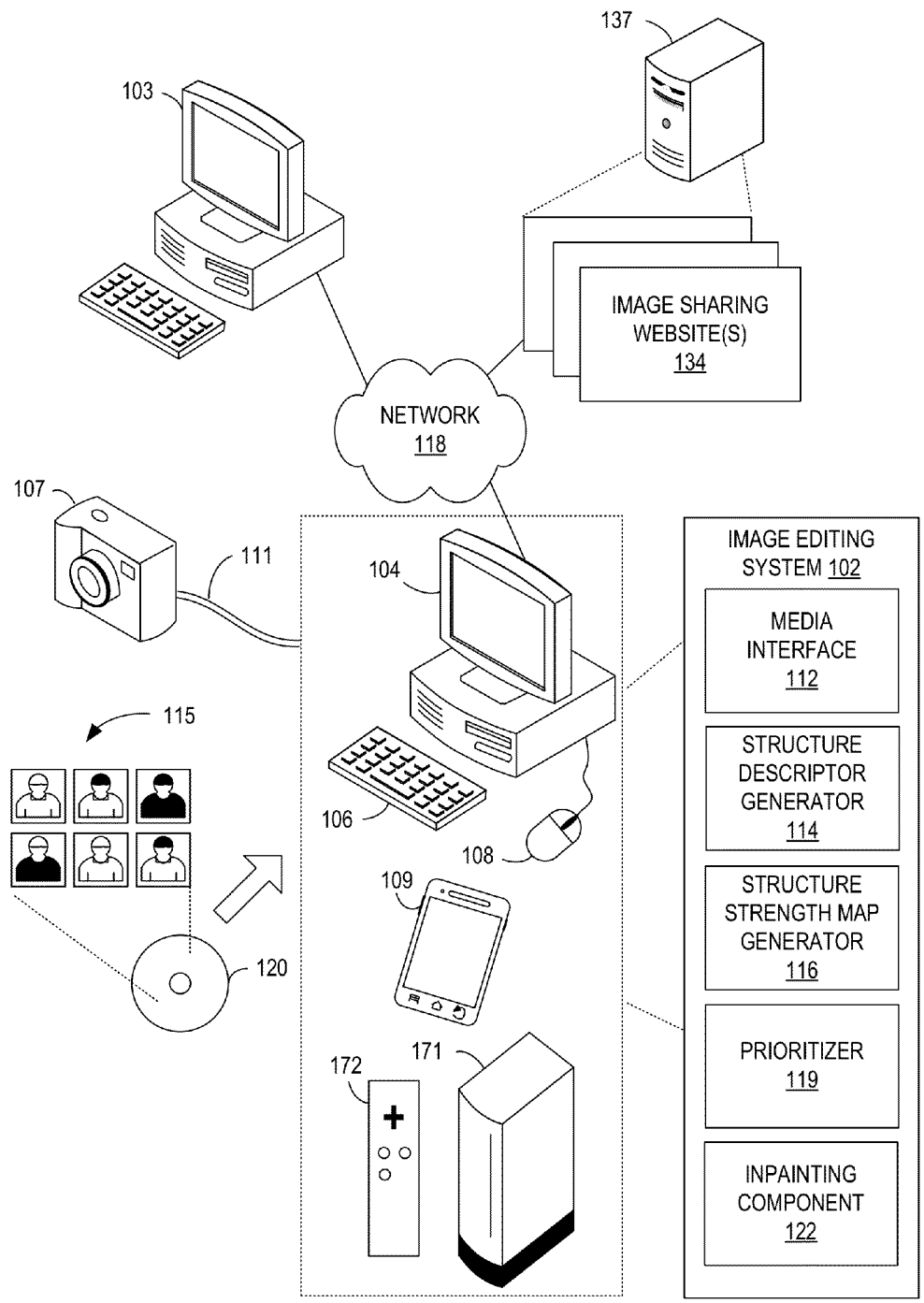
FIG. 1 is a block diagram of an image editing system for facilitating image inpainting in accordance with various embodiments of the present disclosure.

A description of a system for facilitating image inpainting is now described followed by a discussion of the operation of the components within the system. FIG. 1 is a block diagram of an image editing system 102 in which embodiments of the image processing techniques disclosed herein may be implemented. The image editing system 102 may be embodied, for example, as a desktop computer, computer workstation, laptop, a smartphone 109, a tablet, or other computing platform that includes a display 104 and may include such input devices as a keyboard 106 and a mouse 108.

For embodiments where the image editing system 102 is embodied as a smartphone 109 or tablet, the user may interface with the image editing system 102 via a touchscreen interface (not shown). In other embodiments, the image editing system 102 may be embodied as a video gaming console 171, which includes a video game controller 172 for receiving user preferences. For such embodiments, the video gaming console 171 may be connected to a television (not shown) or other display 104.

The image editing system 102 is configured to retrieve, via the media interface 112, digital media content 115 stored on a storage medium 120 such as, by way of example and without limitation, a compact disc (CD) or a universal serial bus (USB) flash drive, wherein the digital media content 115 may then be stored locally on a hard drive of the image editing system 102. As one of ordinary skill will appreciate, the digital media content 115 may be encoded in any of a number of formats including, but not limited to, JPEG (Joint Photographic Experts Group) files, TIFF (Tagged Image File Format) files, PNG (Portable Network Graphics) files, GIF (Graphics Interchange Format) files, BMP (bitmap) files or any number of other digital formats.

As depicted in FIG. 1, the media interface 112 in the image editing system 102 may also be configured to retrieve digital media content 115 directly from a digital camera 107 where a cable 111 or some other interface may be used for coupling the digital camera 107 to the image editing system 102. The image editing system 102 may support any one of a number of common computer interfaces, such as, but not limited to IEEE-1394 High Performance Serial Bus (Firewire), USB, a serial connection, and a parallel connection.

The digital camera 107 may also be coupled to the image editing system 102 over a wireless connection or other communication path. The image editing system 102 may be coupled to a network 118 such as, for example, the Internet, intranets, extranets, wide area networks (WANs), local area networks (LANs), wired networks, wireless networks, or other suitable networks, etc., or any combination of two or more such networks. Through the network 118, the image editing system 102 may receive digital media content 115 from another computing system 103. Alternatively, the image editing system 102 may access one or more image sharing websites 134 hosted on a server 137 via the network 118 to retrieve digital media content 115.

The structure descriptor generator 114 in the image editing system 102 is configured to analyze and identify structural attributes of the media content 115 retrieved by the media interface 112 in order to facilitate image inpainting of the media content 115 for editing purposes. For some embodiments, the structure descriptor generator 114 is configured to determine structure information corresponding to the restoration region, where such structure information may be based on, for example, textual details, level of detail (LOD) information, edge information, etc. found in the media content 115 being edited.

The structure strength map generator 116 is configured to generate a structure strength map corresponding to the restoration region based on the structure information derived by the structure descriptor generator 114. Based on the structure strength map, the prioritizer 119 is configured to determine a priority level for each pixel in the restoration region. The inpainting component 122 then performs priority-based image inpainting according to the respective priority levels of each pixel in the restoration region.

Figure 2:
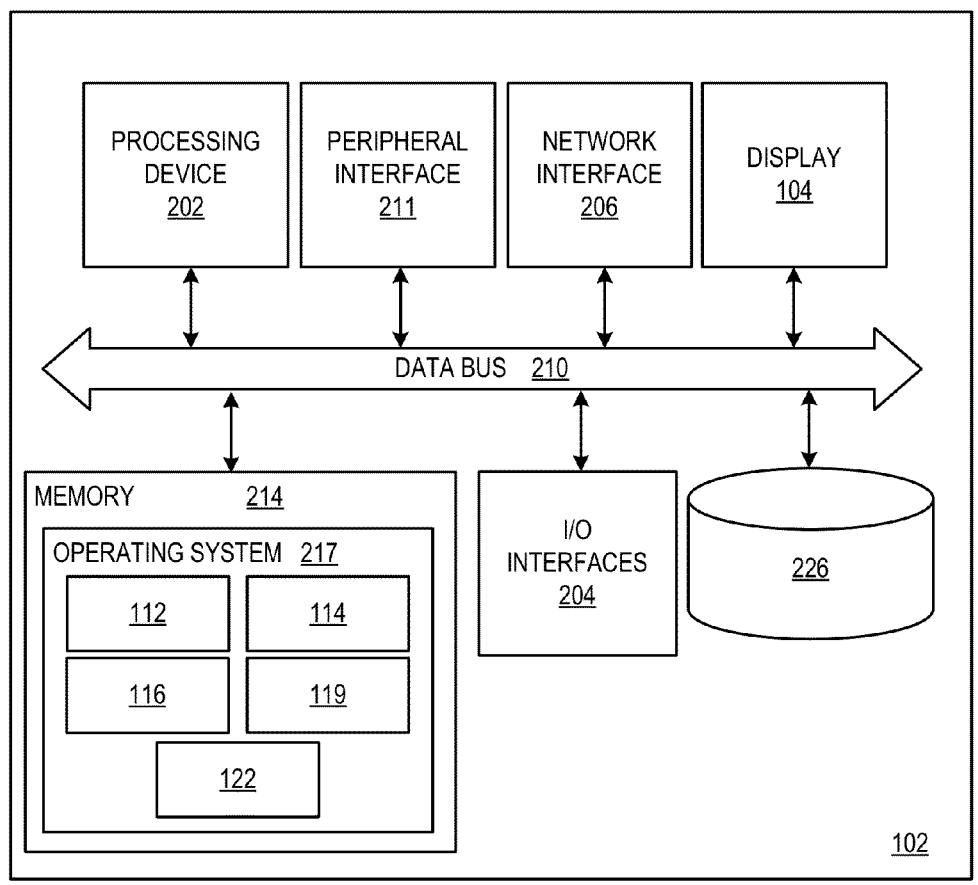
FIG. 2 is a detailed view of the image editing system device of FIG. 1 in accordance with various embodiments of the present disclosure.

FIG. 2 is a schematic diagram of the image editing system 102 shown in FIG. 1. The image editing system 102 may be embodied in any one of a wide variety of wired and/or wireless computing devices, such as a desktop computer, portable computer, dedicated server computer, multiprocessor computing device, smartphone, tablet computing device, and so forth. As shown in FIG. 2, the image editing system 102 comprises memory 214, a processing device 202, a number of input/output interfaces 204, a network interface 206, a display 104, a peripheral interface 211, and mass storage 226, wherein each of these devices are connected across a local data bus 210.

The processing device 202 may include any custom made or commercially available processor, a central processing unit (CPU) or an auxiliary processor among several processors associated with the image editing system 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 217, one or more native applications, emulation systems, or emulated applications for any of a variety of operating systems and/or emulated hardware platforms, emulated operating systems, etc.

The applications may include application specific software which may comprise some or all the components (media interface 112, structure descriptor generator 114, structure strength map generator 116, prioritizer 119, inpainting component 122) of the image editing system 102 depicted in FIG. 1. In accordance with such embodiments, the components are stored in memory 214 and executed by the processing device 202. One of ordinary skill in the art will appreciate that the memory 214 can, and typically will, comprise other components which have been omitted for purposes of brevity.

Input/output interfaces 204 provide any number of interfaces for the input and output of data. For example, where the image editing system 102 comprises a personal computer, these components may interface with one or more user input devices via the I/O interfaces 204, where the user input devices may comprise a keyboard 106 (FIG. 1) or a mouse 108 (FIG. 1). The display 104 may comprise a computer monitor, a plasma screen for a PC, a liquid crystal display (LCD), a touchscreen display, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

With further reference to FIG. 2, network interface 206 comprises various components used to transmit and/or receive data over a network environment. For example, the network interface 206 may include a device that can communicate with both inputs and outputs, for instance, a modulator/demodulator (e.g., a modem), wireless (e.g., radio frequency (RF)) transceiver, a telephonic interface, a bridge, a router, network card, etc.). The image editing system 102 may communicate with one or more computing devices via the network interface 206 over the network 118 (FIG. 1). The image editing system 102 may further comprise mass storage 226. The peripheral interface 211 supports various interfaces including, but not limited to IEEE-1294 High Performance Serial Bus (Firewire), USB, a serial connection, and a parallel connection.

Figure 3:
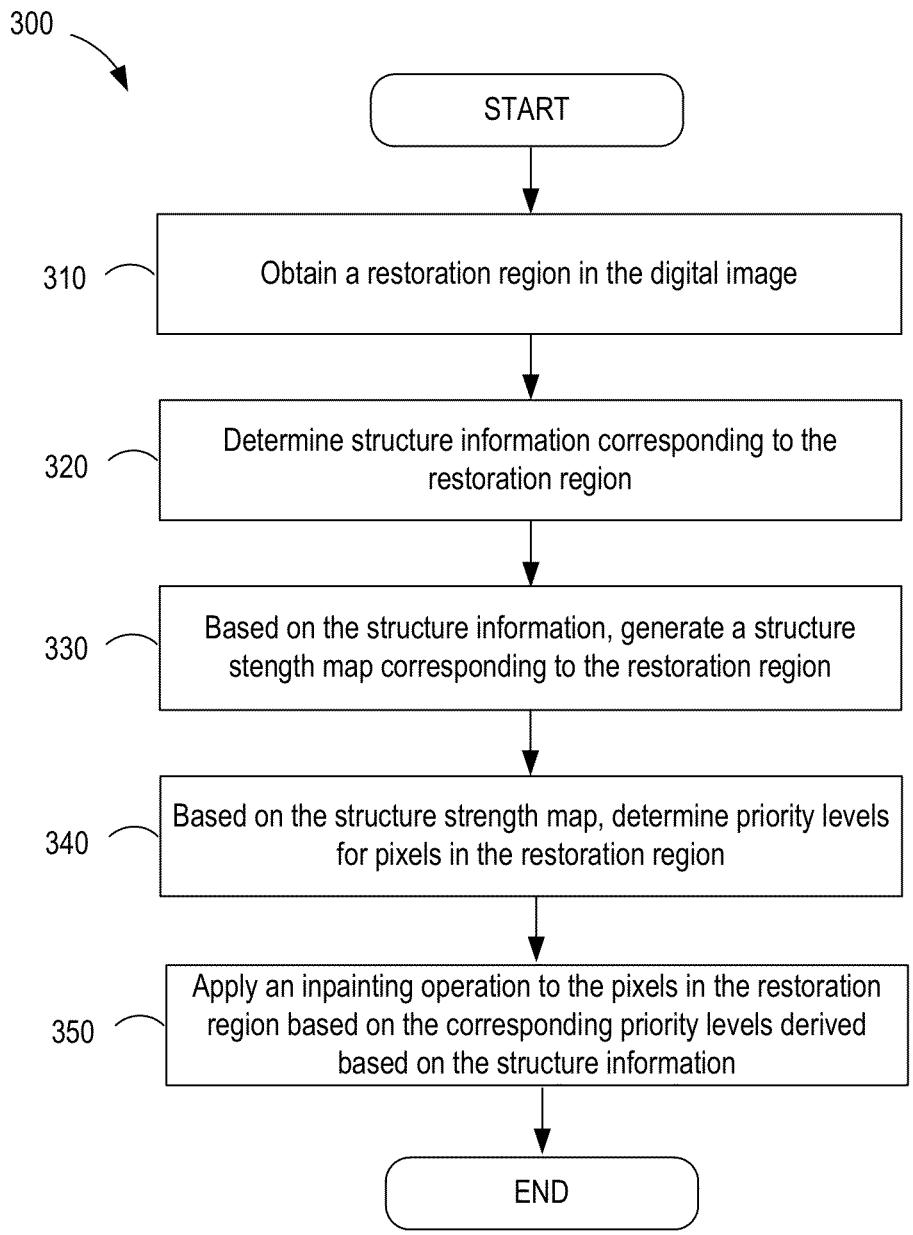
FIG. 3 is a top-level flowchart illustrating examples of functionality implemented as portions of the image editing device of FIG. 1 for facilitating image inpainting according to various embodiments of the present disclosure.

Reference is made to FIG. 3, which is a flowchart 300 in accordance with one embodiment for facilitating image inpainting of a digital image based on structural information contained in the digital image. It is understood that the flowchart 300 of FIG. 3 provides merely an example of the many different types of functional arrangements that may be employed to implement the operation of the various components of the image editing system 102 (FIG. 1). As an alternative, the flowchart of FIG. 3 may be viewed as depicting an example of steps of a method implemented in the image editing system 102 according to one or more embodiments.

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

Beginning with block 310, the image editing system 102 obtains a restoration region in a digital image obtained by the media interface 112 (FIG. 1). The restoration region may correspond to one or more objects that a user of the image editing system 102 wishes to remove from the digital image. As discussed earlier, the digital image may be received by the media interface 112 (FIG. 1) from a storage medium 120 (FIG. 1) or other source such as a digital camera 107 (FIG. 1), image sharing website 134 (FIG. 1), etc.

In block 320, the structure descriptor generator 114 (FIG. 1) in the image editing system 102 analyzes and identifies attributes of the media content 115 (FIG. 1) retrieved by the media interface 112 to determine structure information corresponding to the restoration region. For some embodiments, structure information corresponding to the restoration region is embodied as structure descriptors based on such structural information as textual details, level of detail (LOD) information, edge information, etc. found in the digital image being edited.

In this regard, structure descriptor may comprise an edge vector that further comprises an edge magnitude, an edge direction, a vector representing the texture similarity, or a vector representing the level of detail information (or any combination thereof). As described in more detail below, structural attributes corresponding to objects both within the restoration region and outside the restoration region are derived based on edge detection and/or other image details in order to ensure structural continuity during the image inpainting process.

In block 330, the structure strength map generator 116 (FIG. 1) generates a structure strength map corresponding to the restoration region based on the structure information derived by the structure descriptor generator 114. In block 340, based on the structure strength map, the prioritizer 119 (FIG. 1) determines priority levels for pixels in the restoration region. Note that the pixels in the restoration region may refer to all or a subset of the pixels in the restoration region. In block 350, the inpainting component 122 (FIG. 1) performs image inpainting to the pixels in the restoration region based on the respective priority levels of the pixels in the restoration region.

Figure 4:
FIGS. 4 and 5 depict an example digital image to be processed by the image editing system of FIG. 1 in accordance with various embodiments of the present disclosure.
Figure 5:
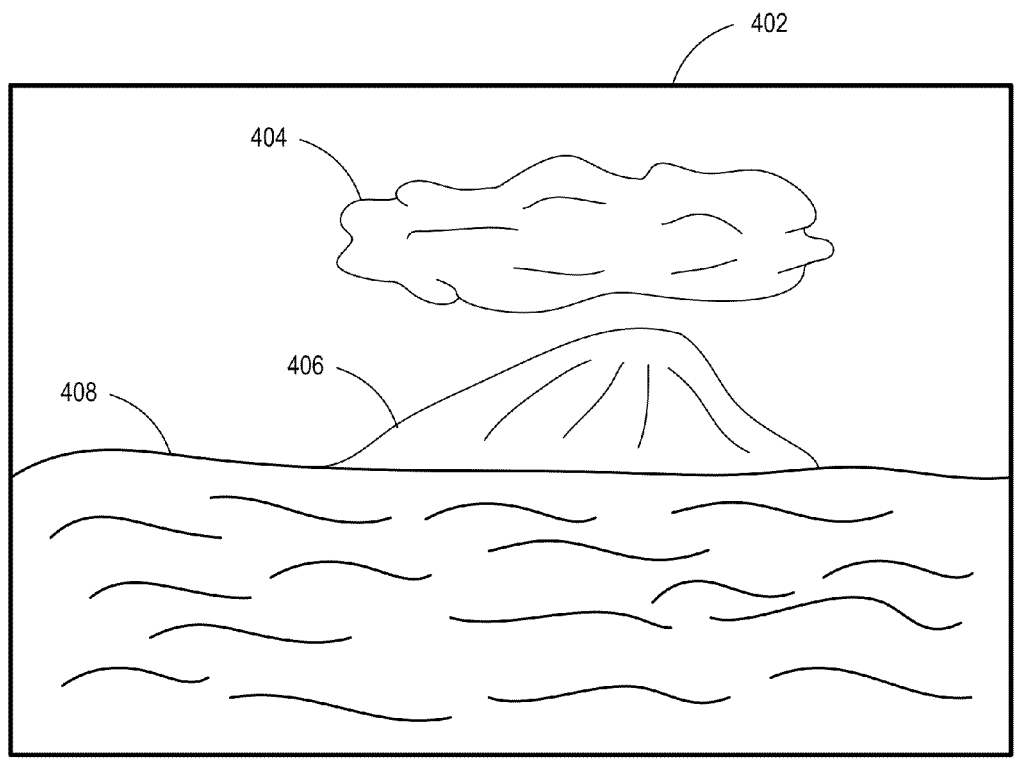

To further illustrate the various concepts disclosed, reference is made to FIGS. 4-12, which illustrate various aspects of image inpainting in accordance with various embodiments of the present disclosure. Shown in FIG. 4 is an example of a digital image 402, which the user wishes to edit. As shown in the line drawing representation in FIG. 5, the digital image 402 comprises various objects, including clouds 404, an island 406, and the ocean 408.

Figure 11:
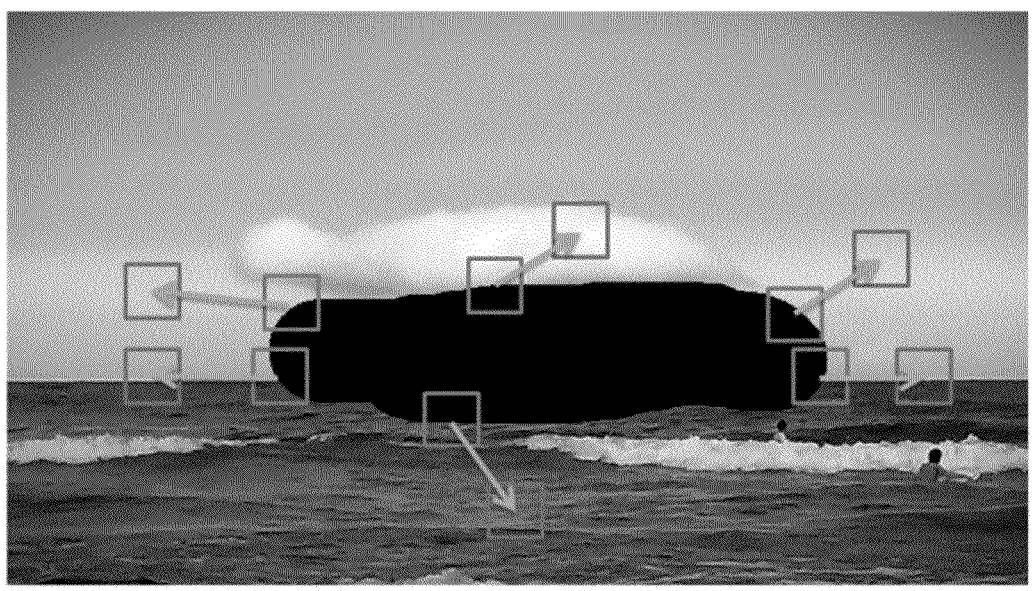
FIG. 11 illustrates the concept of patch matching for performing image inpainting.

With reference to FIG. 11, patch matching is a commonly used technique in conventional systems, where the missing information resulting from removal of an object (i.e., the island 406 (FIG. 4)) from the digital image is reconstructed using suitable patches from information associated with areas in the image that is known (i.e., those areas outside the area to be restored). Based on the patches found in portions outside of the restoration region, the restoration region is filled by copying or blending pixels from the identified patches.

Figure 12:
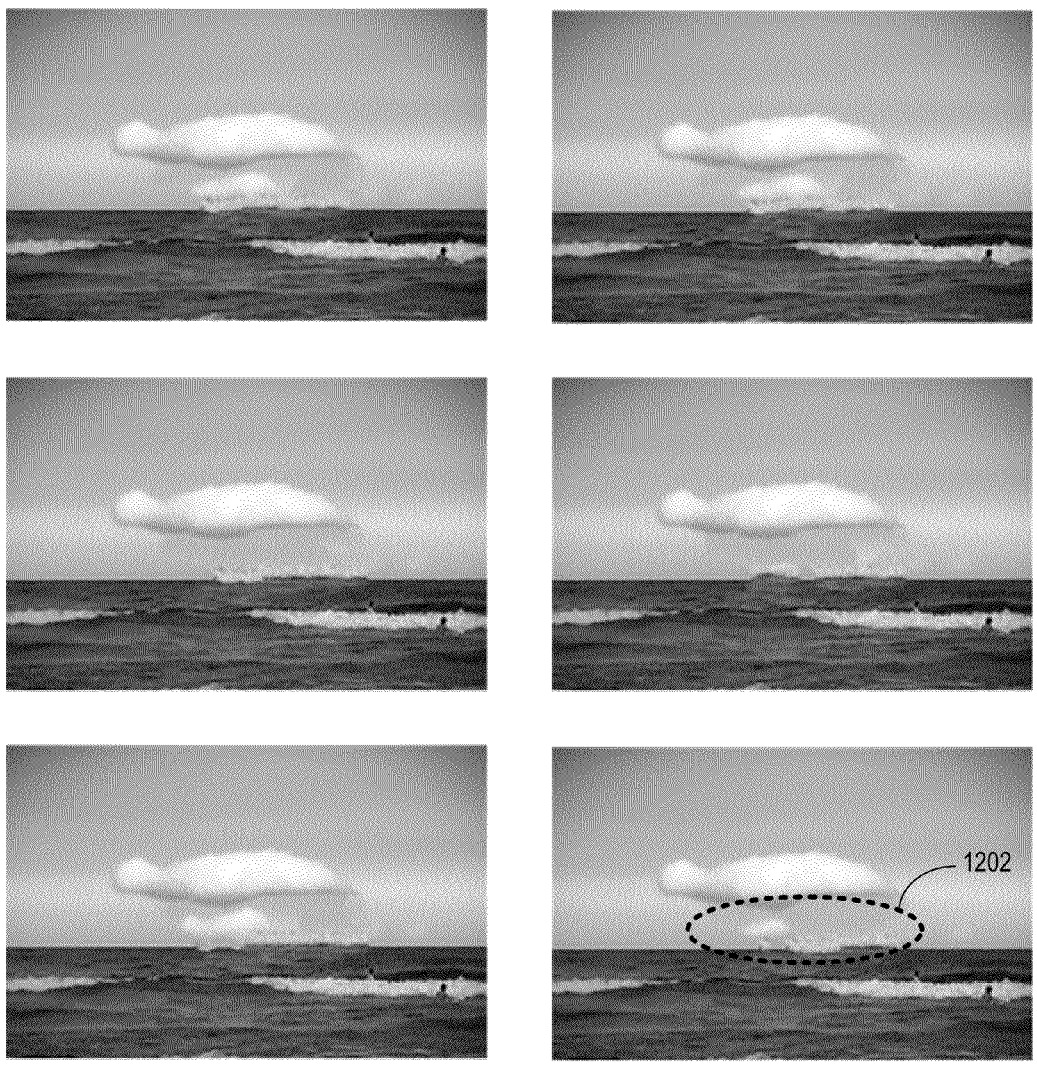
FIG. 12 illustrates the progression in performing image inpainting on a digital image utilizing the patch matching technique illustrated in FIG. 11.

As shown in the example in FIG. 11, patches may span the background, the ocean, as well as the cloud object above the restoration region. FIG. 12 illustrates the progression of image inpainting based on a patch matching technique. As shown, the resulting image includes artifacts 1202 (e.g., clouds) within the restoration region where the island was previously located. The image inpainting techniques disclosed herein take into consideration the structural attributes of pixels both inside and outside the restoration in order to ensure structural continuity.

Figure 6:
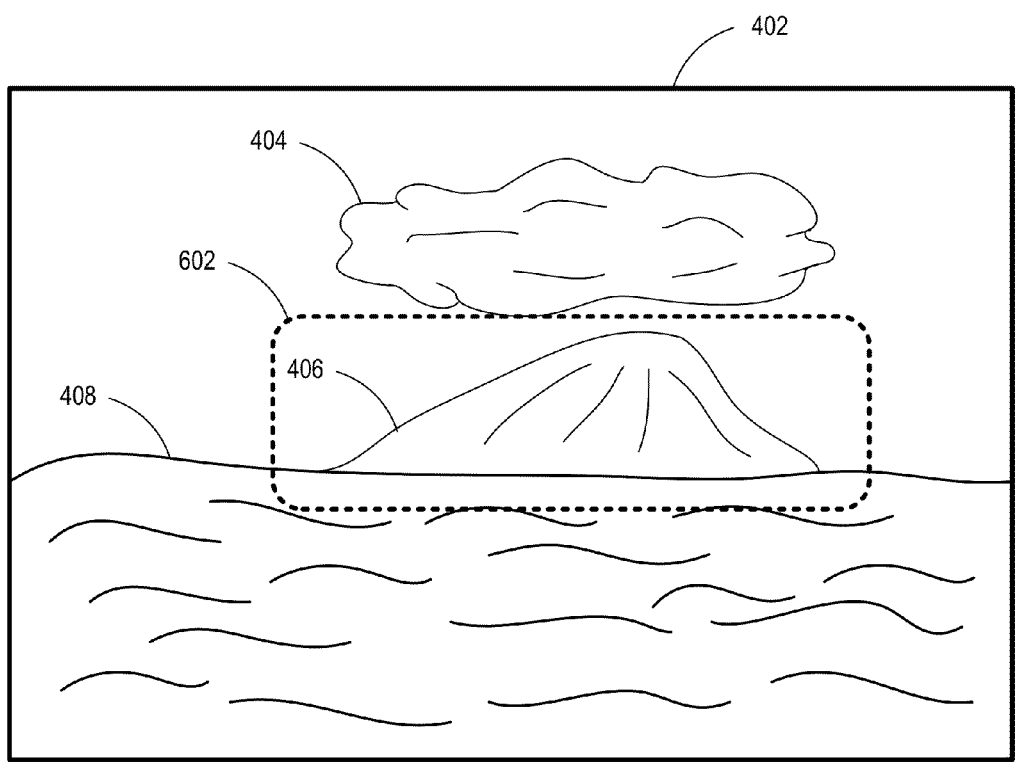
FIG. 6 depicts an example of a restoration region for image inpainting performed by the image editing system of FIG. 1 in accordance with various embodiments of the present disclosure.

Referring back to FIG. 5, assume for purposes of illustration that the user wishes to remove the island 406 from the digital image 402. In accordance with various embodiments, the image editing system 102 (FIG. 1) obtains user input specifying a restoration region. With reference to FIG. 6, the user may, for example, utilize a mouse 108 (FIG. 1) or other pointer device to manually draw a boundary around the object to be removed, thereby defining a restoration region 602.

Upon retrieving a restoration region 602, the structure descriptor generator 114 (FIG. 1) in the image editing system 102 analyzes and identifies attributes of the digital image 402 to determine structure information corresponding to the restoration region. For some embodiments, the structure information is derived in the form of structure descriptors based on such structural information as textual details, level of detail (LOD) information, edge information, etc. found in the digital image 402. As discussed earlier, structure descriptor may comprise an edge vector that further comprises an edge magnitude, an edge direction, a vector representing the texture similarity, or a vector representing the level of detail information (or any combination thereof). Structural attributes corresponding to objects both within the restoration region and outside the restoration region are derived based on edge detection and/or other image details in order to ensure structural continuity during the image inpainting process. In this regard, structure analysis applied in deriving structural attributes may comprise edge detection analysis, texture synthesis analysis, or level of detail (LOD) analysis (or any combination thereof).

Figure 7A:
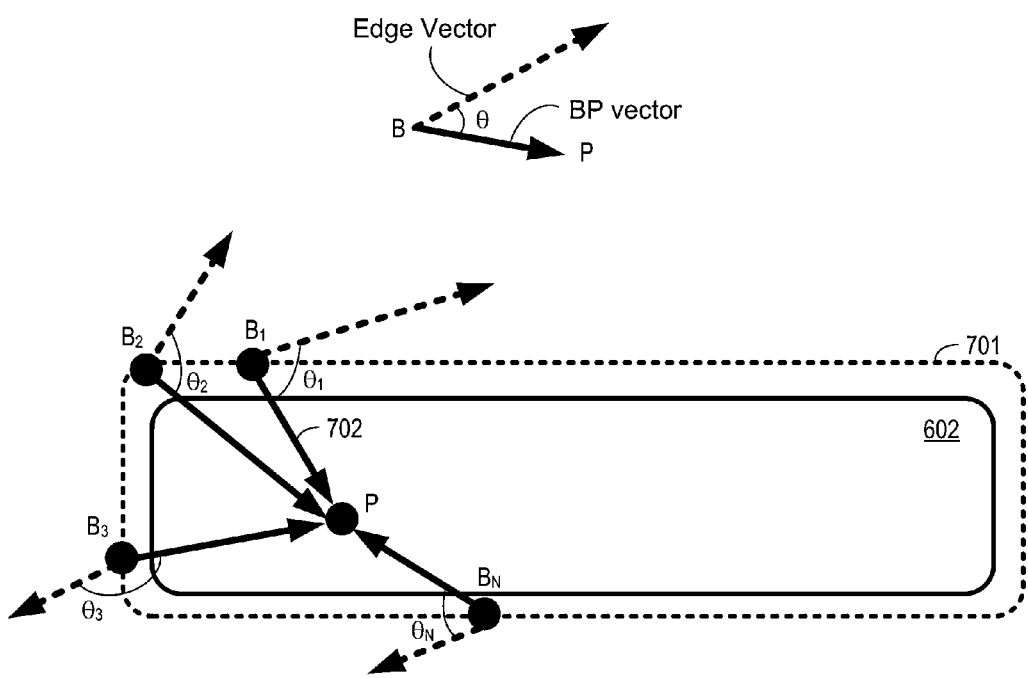
FIGS. 7A-E illustrate concepts relating to edge vectors and BP vectors for deriving a structure strength value for each pixel in the restoration region in accordance with various embodiments of the present disclosure.
Figure 7B:
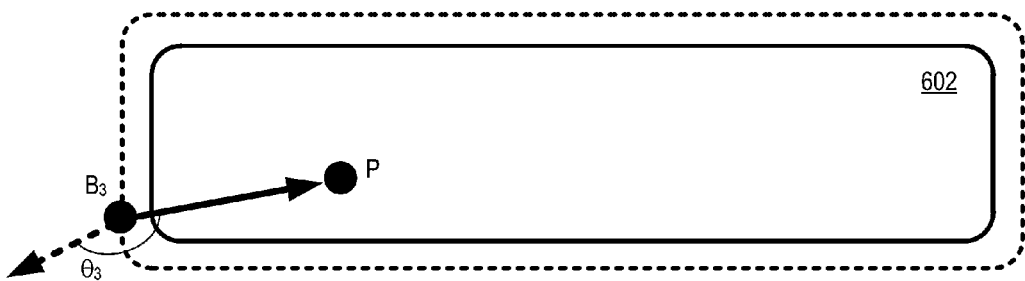

Reference is made to FIGS. 7A and 7B, which illustrate derivation of structural descriptors in accordance with various embodiments. For implementations where edge detection is utilized, structure descriptors are derived that to determine the correlation in structural attributes of a point "B" and a point "P," wherein point B represents a pixel located on a region 701 surrounding the boundary of the restoration region 602 and point P represents a pixel within the restoration region 602. For some embodiments, the surrounding region 701 is located a few pixels (e.g., 5 to 10 pixels) from the boundary of the restoration region 602. In this regard, pixels nearby the boundary 602 are sampled.

Note, however, that for alternative embodiments, the pixels located directly on the boundary 602 may also be sampled. For other embodiments, both pixels on and near the boundary may be sampled. Furthermore, the number of points that are sampled may be based on a predetermined number. For example, a sample size of 100 pixels (each corresponding to a point B) may be utilized in deriving structure descriptors. In accordance with some embodiments, for each pixel in the restoration region 602 (point P), the correlation is determined relative to an edge vector associated with every pixel (point B) along the boundary.

Figure 8:
FIG. 8 illustrates edge vectors for each pixel on the boundary of the restoration region.

As shown in FIG. 7A, an edge vector for every pixel on the boundary (point B) is derived, where the edge vector for point B is defined by an edge strength and an edge direction. For some embodiments, the edge vector represents the magnitude and direction of the largest possible edge difference for that given point B. FIG. 8 illustrates the edge vectors for every boundary pixel in the restoration region where edge characteristics of the boundary pixels are used for deriving structure strength values.

Next, for a given point P (e.g., point $P_1$), a BP vector is defined with respect to every pixel on the boundary of the restoration region (Point $B_{1\ to\ N}$). That is, for a given point P, BP vectors 702 are derived for every pixel (point B) on the boundary of the restoration region such that BP vectors 702 are formed for every boundary pixel (point B) relative to a common point P, as illustrated in FIG. 7A. As shown by the dashed lines extending from each boundary pixel (point B), each boundary pixel has a corresponding edge vector. Once all the BP vectors 702 have been derived by the structure descriptor generator 114 (FIG. 1), a correlation between each BP vector 702 and a corresponding edge vector is determined.

For example, the correlation between the $B_1P$ vector 702 and the edge vector for point $B_1$ is calculated followed by the correlation between the $B_2P$ vector 702 and the edge vector for point $B_2$ and continuing on to the correlation between the $B_NP$ vector 702 and the edge vector for point $B_N$, where N represents the total number of boundary pixels. The BP vector 702 corresponding to the (P, $B_N$) combination that exhibits the strongest correlation with respect to the edge vector of the corresponding point $B_N$ is determined to be the structure strength value for the point P.

The correlation of a (P, B) combination is a function of the angle (A) formed between the edge vector of point B and the BP vector extends from point B to a point P as represented by the following expression:

$$\text{correlation}(P,B) = f(\theta, \text{BP vector}, B \text{ edge vector}).$$

In the expression above, the function f( ) may represent, for example, a cosine function, which produces a higher value at 0 or 180 degrees. The function f( ) is also related to the magnitude of BP and B edge vector, as shown in the expression below:

$$\text{Correlation}(P, B) =$$
$$f(\theta, BP \text{ vector}, B \text{ edge vector}) = \cos\theta * \frac{\overline{B \text{ edge vector}}}{\overline{BP}}.$$

To illustrate, reference is made to FIG. 7B, which shows that the BP vector 702 formed between point P and point $B_3$ exhibits the strongest correlation with the edge vector for point $B_3$ (represented by the dashed line) among all the $PB_N$ combinations. For some embodiments, an angle (A) between an edge vector and a BP vector closer to either 0 degrees or 180 degrees exhibits a stronger correlation between the edge vector and the BP vectors. The structure descriptor generator 114 stores the correlation value as the structure strength value for that given point P. In particular, the structure strength value of a given pixel within the restoration region (point P) is derived according to the following expression:

$$\text{Structure Strength}(P) = \max_{B_i}\text{correlation}(P,B_i)$$

Figure 7C:
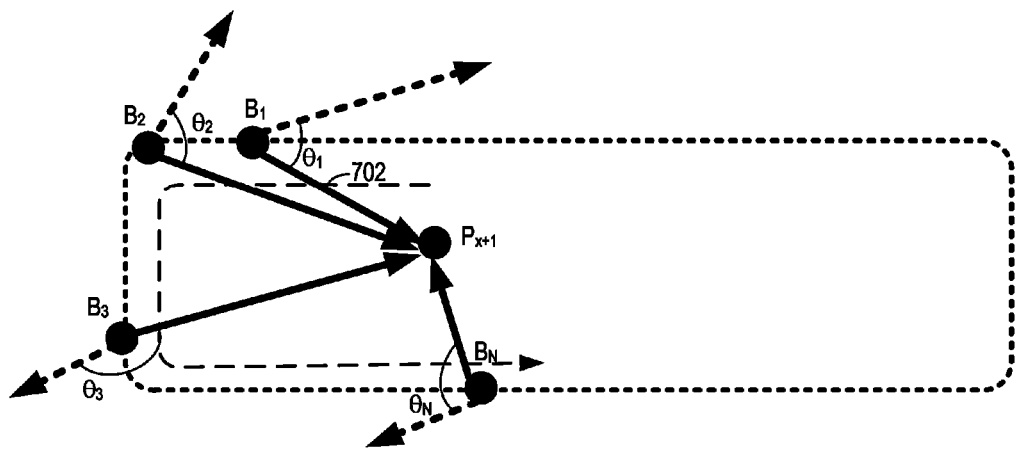

That is, for a given point P, the structure strength value is calculated according to the highest correlation value corresponding to a given (P, B) combination when compared to all (P, B) combinations. This process is repeated for every pixel (point P) within the restoration region such that every point P is assigned a corresponding structure strength value. FIG. 7C illustrates how the process is repeated for the next restoration region pixel (Point $P_{x+1}$) where the correlation between the $B_1P_{x+1}$ vector 702 and the edge vector for point $B_1$ is calculated followed by the correlation between the $B_2 P_{x+1}$ vector 702 and the edge vector for point $B_2$ and so on.

Figure 7D:
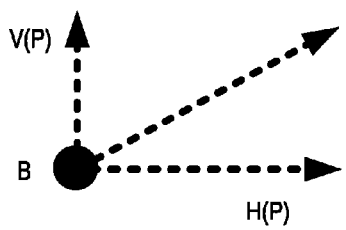

FIG. 7D illustrates the horizontal and vertical magnitude components of an edge vector for a given point B. For some embodiments, edge vectors are derived based on pixel blocks centered about a given point B. As shown, the horizontal magnitude component comprises pixel values above and below the pixel row in which point B is located. The pixel values may represent, for example, a difference in color values relative to the pixel row in which point B is located. For example, for the pixel block corresponding to the horizontal edge magnitude, the value "−1" at the upper left-hand corner of the pixel block represents a color difference value of "−1" relative to the pixel immediately below that pixel. Similarly, the values in the pixel block for the vertical magnitude component correspond to a difference in color values relative to a pixel column in which point B is located. Thus, the value "−1" shown in the upper left-hand corner of the pixel block represents a color difference value of "−1" relative to the pixel immediately to the right of that pixel.

Figure 7E:
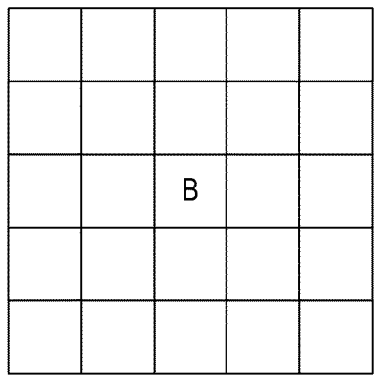
Figure 7E:
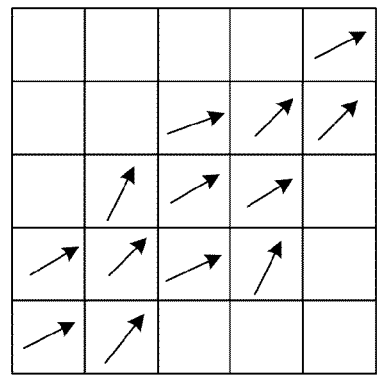
Figure 7E:
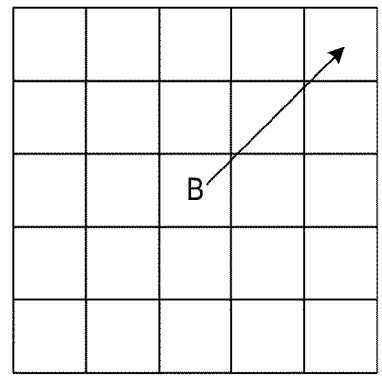

FIG. 7E illustrates the derivation of an edge vector. Deriving an edge vector of individual pixels is generally less stable than deriving an edge vector for an (n×n) pixel block (i.e., for a larger sample of pixels rather than for a single pixel). As such, for various embodiments, the edge vector for a point B is derived based on the edge vectors for an (n×n) pixel block centered about point B. A smoothing kernel may then be applied to derive a more stable edge vector for the given point B where the edge vector is generated for the entire (n×n) pixel block rather than for a single pixel point.

Priority-based image inpainting is then performed according to the structure strength value of each point P. Thus, for every point P within the restoration region, the edge vector of a boundary pixel that is most closely correlated with the vector formed between the point and that boundary pixel is identified. The correlation value serves as the structure strength or priority level for that pixel. The prioritizer 119 (FIG. 1) then determines a priority level for each pixel in the restoration region based on the corresponding structure strength value.

Figure 9:
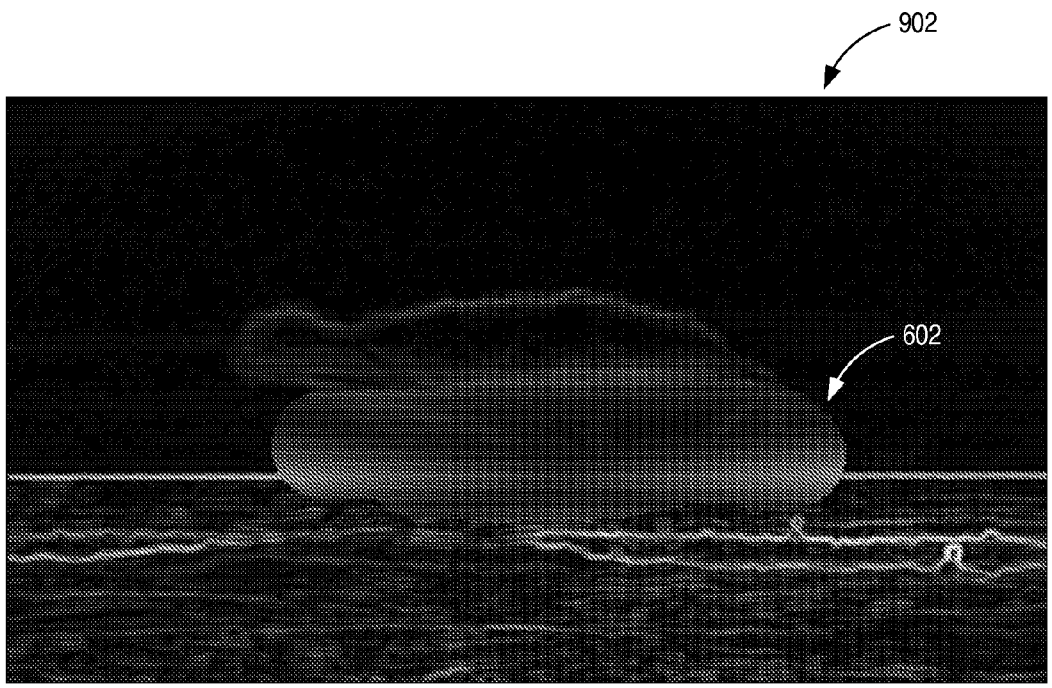
FIG. 9 illustrates a structure strength map derived by the structure strength map generator in FIG. 1 in accordance with various embodiments of the present disclosure.
Figure 9:
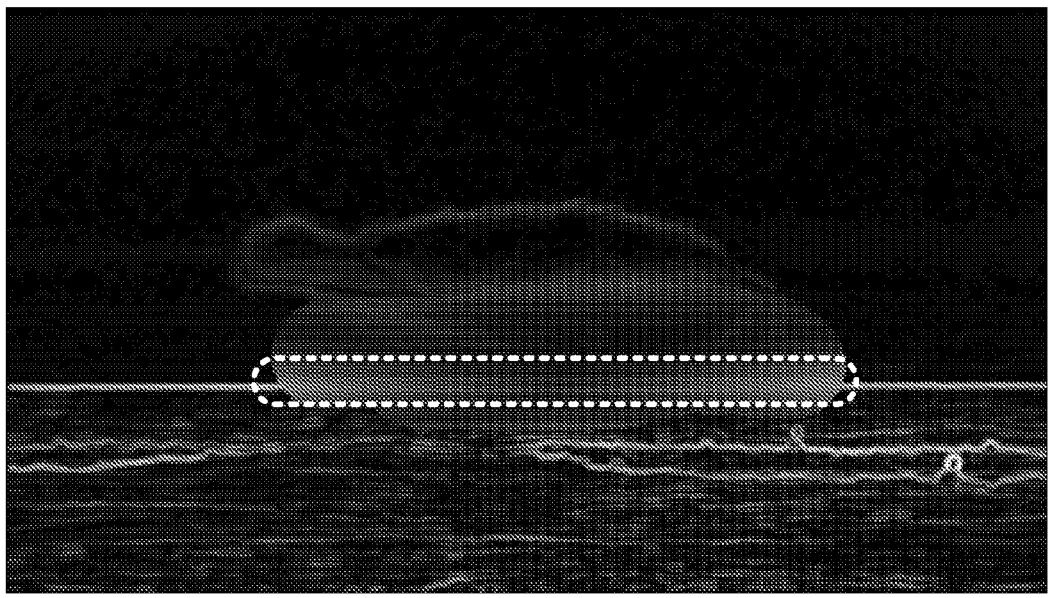

With reference to FIG. 9, the structure strength map generator 116 (FIG. 1) generates a structure strength map 902 corresponding to the restoration region 602 based on the priority assigned by the prioritizer 119 (FIG. 1). In the structure strength map 902 shown, the lighter color portions (e.g., the highlighted portion) represent those pixels within the restoration region 602 (FIG. 6) that exhibit a high degree of correlation with an edge vector corresponding to a boundary pixel. As such, those portions are given higher priority and undergo image inpainting first.

Figure 10:
FIG. 10 illustrates the progression in performing image inpainting on a digital image in accordance with various embodiments of the present disclosure.

Reference is made to FIG. 10, which illustrates the progression of image inpainting performed by the inpainting component 122 (FIG. 1). As shown in the fourth slide in FIG. 10, the middle portion 1002 undergoes image inpainting. The inpainting component 122 continues to apply image inpainting based on the assigned priorities of the pixels in the restoration region. The final version of the digital image 1004 after image inpainting is shown at the bottom. Notably, the editing digital image 102 does not include any artifacts (e.g., cloud objects due to patch matching) in the restoration region.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A method for editing a digital image in an image editing device, comprising:
    obtaining a restoration region in the digital image;
    determining structure information corresponding to the restoration region;
    based on the structure information, generating a structure strength map corresponding to the restoration region;
    based on the structure strength map, determining priority levels for all of the pixels in the restoration region; and
    applying an inpainting operation to the pixels in the restoration region based on the corresponding priority levels derived based on the structure information.

2. The method of claim 1, wherein the restoration region is obtained via user input, wherein the user input corresponds to an object in the digital image.

3. The method of claim 1, wherein determining structure information comprises computing structure descriptors corresponding to at least one of:
    pixels near a boundary of the restoration region; and
    pixels on the boundary of the restoration region,
wherein structure descriptors are computed based on structure analysis.

4. The method of claim 3, wherein the structure analysis comprises at least one of: edge detection analysis, texture synthesis analysis, and level of detail (LOD) analysis.

5. The method of claim 3, wherein each structure descriptor comprises at least one of: an edge vector comprising an edge magnitude and an edge direction, a vector representing texture similarity, and a vector representing level of detail information.

6. The method of claim 3, wherein determining structure information further comprises determining, for a pixel within the restoration region, vectors extending from the restoration region pixel to each of at least a portion of the pixels with a corresponding calculated structure descriptor.

7. The method of claim 6, wherein generating a structure strength map comprises determining correlation values, where each correlation value is calculated according to a vector extending from the restoration region pixel to each of at least a portion of the pixels with a corresponding calculated structure descriptor, and a corresponding edge vector of the each of the least a portion of the pixels with a corresponding calculated structure descriptor.

8. The method of claim 7, wherein the structure strength map comprises maximum correlation values respectively calculated for each pixel in the restoration region with respect to all edge vectors.

9. A method for editing a digital image in an image editing device, comprising:
    obtaining a restoration region in the digital image;
    generating a structure strength map corresponding to the restoration region based on structure characteristics associated with each pixel in the restoration region;
    based on the structure strength map, determining priority levels for all of the pixels in the restoration region; and
    applying an inpainting operation to pixels in the restoration region, beginning with a pixel having a highest relative priority determined based on the structure characteristics.

10. The method of claim 9, wherein the structure characteristics comprise an edge magnitude and an edge direction.

11. The method of claim 9, wherein for each restoration region pixel, the structure characteristics are calculated for at least one of:
    pixels near a boundary of the restoration region; and
    pixels on the boundary of the restoration region.

12. The method of claim 11, wherein for each restoration region pixel, a highest correlation value associated with the restoration region pixel and a pixel with structure characteristics combination is selected as a structure strength value for the restoration region pixel.

13. The method of claim 12, wherein the structure strength map comprises the structure strength values for each restoration region pixel.

14. The method of claim 9, wherein the structure characteristics comprise texture characteristics.

15. The method of claim 9, wherein the structure characteristics comprise level of detail (LOD) characteristics.

16. A system for editing a digital image, comprising:
    a structure descriptor generator configured to determine structure descriptors corresponding to a restoration region within the digital image to undergo an inpainting operation;
    a structure strength map generator configured to generate a structure strength map corresponding to the restoration region based on the structure descriptors;

a prioritizer configured to determine priority levels for all of the pixels in the restoration region based on the structure strength map; and an inpainting component configured to apply the inpainting operation to the pixels in the restoration region based on the corresponding priority levels derived based on the structure descriptors.

17. The system of claim 16, wherein the structure descriptors comprise edge vectors representing an edge strength and edge direction, wherein the structure descriptor generator is configured to determine edge vectors for at least one of:

pixels near a boundary of the restoration region; and pixels on the boundary of the restoration region.

18. The system of claim 17, wherein the structure descriptor generator determines, for each pixel in the restoration region, a vector extending from the restoration region pixel to each of at least a portion of the pixels with a corresponding calculated structure descriptor.

19. The system of claim 18, wherein the structure strength map generator is configured to assign, for each pixel within the restoration region, a structure strength value based on a restoration region pixel and an edge vector exhibiting a highest correlation value.

20. The system of claim 18, wherein the prioritizer configured to determine the priority level based on the assigned structure strength values.

21. The system of claim 18, wherein the inpainting component is configured to apply the inpainting operation beginning with pixels in the restoration region having a highest priority relative to a remaining pixels in the restoration region.

* * * * *